US011228221B2

(12) United States Patent
Horii

(10) Patent No.: US 11,228,221 B2
(45) Date of Patent: Jan. 18, 2022

(54) MOTOR

(71) Applicant: Nidec Corporation, Kyoto (JP)

(72) Inventor: Yuya Horii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 28 days.

(21) Appl. No.: 16/904,619

(22) Filed: Jun. 18, 2020

(65) Prior Publication Data

US 2020/0412196 A1 Dec. 31, 2020

(51) Int. Cl.
*H02K 3/52* (2006.01)
*H02K 5/167* (2006.01)
*H02K 21/22* (2006.01)
*H02K 7/08* (2006.01)

(52) U.S. Cl.
CPC .......... *H02K 3/522* (2013.01); *H02K 5/1675* (2013.01); *H02K 7/085* (2013.01); *H02K 21/22* (2013.01); *H02K 2203/03* (2013.01)

(58) Field of Classification Search
CPC .......... H02K 3/52; H02K 21/22; H02K 5/167; H02K 7/08; H02K 3/522; H02K 1/187; H02K 7/085; H02K 11/33; H02K 5/1675; H02K 3/325; H02K 21/222; H02K 2203/03
See application file for complete search history.

(56) References Cited

U.S. PATENT DOCUMENTS

| | | | | |
|---|---|---|---|---|
| 2016/0149473 | A1* | 5/2016 | Wang | H02K 5/20 |
| | | | | 310/64 |
| 2016/0336838 | A1* | 11/2016 | Kouda | H02K 3/522 |
| 2017/0106522 | A1* | 4/2017 | Coates | H02K 3/487 |
| 2017/0170705 | A1* | 6/2017 | Yamakawa | H02K 1/146 |
| 2019/0372421 | A1* | 12/2019 | Amaya | H02K 1/185 |

FOREIGN PATENT DOCUMENTS

JP 06-253482 A 9/1994

* cited by examiner

*Primary Examiner* — Naishadh N Desai
(74) *Attorney, Agent, or Firm* — Keating & Bennett

(57) ABSTRACT

A motor includes a stator with a stator core, an insulator, coils, and a terminal pin. The stator core includes an annular core back and teeth. The teeth extend radially outward from the core back and are arranged in the circumferential direction. The coil is defined by a conductive wire wound around a tooth via the insulator. The conductor is connected to the conductive wire and is connected to the circuit board. The insulator includes a cylindrical terminal holder located between adjacent ones of the teeth, extends in the axial direction, and accommodates the conductor. The core back includes a stator recess located between adjacent ones of the teeth and is recessed radially inward from the radially outer surface. The stator recess accommodates at least a portion of the terminal holder.

9 Claims, 6 Drawing Sheets

MOTOR

CROSS REFERENCE TO RELATED APPLICATION

The present application claims priority under 35 U.S.C. § 119 to Japanese Application No. 2019-122058 filed on Jun. 28, 2019, the entire contents of which are hereby incorporated herein by reference.

FIELD OF THE INVENTION

The present disclosure relates to a motor.

BACKGROUND

A conventional motor includes, for example, a stator core, an insulator, coils, a conductive member (conductive pin), and a circuit board. The stator core has an annular core back and a plurality of teeth extending radially outward from the core back and disposed in the circumferential direction. The insulator covers the stator core, and the coil is formed by winding a conductive wire around a tooth via the insulator.

The conductive pin is disposed between adjacent teeth and is accommodated in a through-hole formed in the insulator. The conductive pin is connected to the conductive wire, and the lower end of the conductive pin is connected to the circuit board.

However, in the conventional motor, the space between the adjacent teeth is narrowed by the conductive pin, and there is a possibility that the number of turns of the conductive wire wound around the tooth cannot be increased.

SUMMARY

A motor according to an example embodiment of the present disclosure includes a stationary assembly and a rotary assembly. The rotary assembly includes a shaft that rotates about a central axis extending vertically. The stationary assembly includes an annular stator surrounding the central axis, and a circuit board. The circuit board is below the stator in an axial direction. The stator includes a stator core, an insulator, a coil, and a conductor. The stator core includes an annular core back and teeth. The teeth extend radially outward from the core back and are arranged in a circumferential direction. The insulator covers at least a portion of the stator core. The coil is defined by a conductive wire wound around a tooth via the insulator. The conductor is connected to the conductive wire and is connected to the circuit board. The insulator includes a cylindrical terminal holder located between adjacent teeth, extending in the axial direction, and accommodating the conductor. The core back includes a stator recess located between adjacent teeth and is recessed radially inward from a radially outer surface. The stator recess accommodates at least a portion of the terminal holder.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present application will be described with reference to the drawings. In the present application, a direction parallel to the central axis of a motor is referred to as an "axial direction", a direction orthogonal to the central axis of the motor is referred to as a "radial direction", and a direction along an arc having its center at the central axis of the motor is referred to as a "circumferential direction". In the present application, the shape and positional relationship of each part will be described with the axial direction being the vertical direction and the circuit board side with respect to the stator core being below. It should be noted that the definition of the vertical direction is made simply for the sake of description, and is not meant to restrict actual relative position and direction.

In addition, a "parallel direction" in the present application includes a substantially parallel direction. In addition, an "orthogonal direction" in the present application includes a substantially orthogonal direction.

Figure 1:
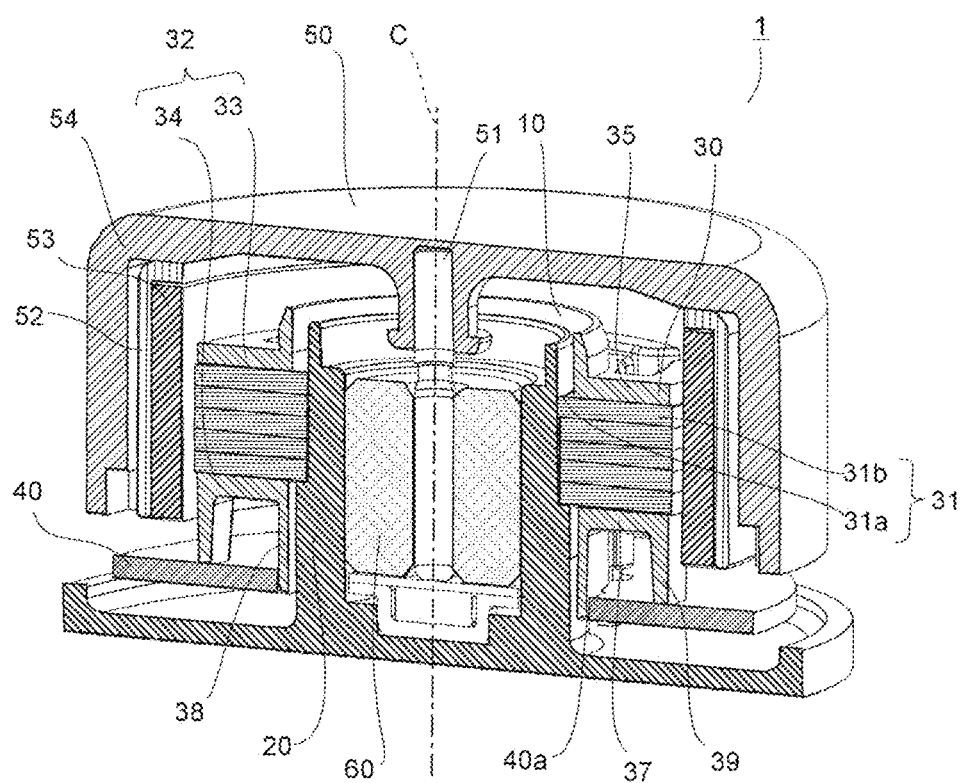
FIG. 1 is a perspective view of a vertical cross section of a motor according to an example embodiment of the present disclosure.
Figure 2:
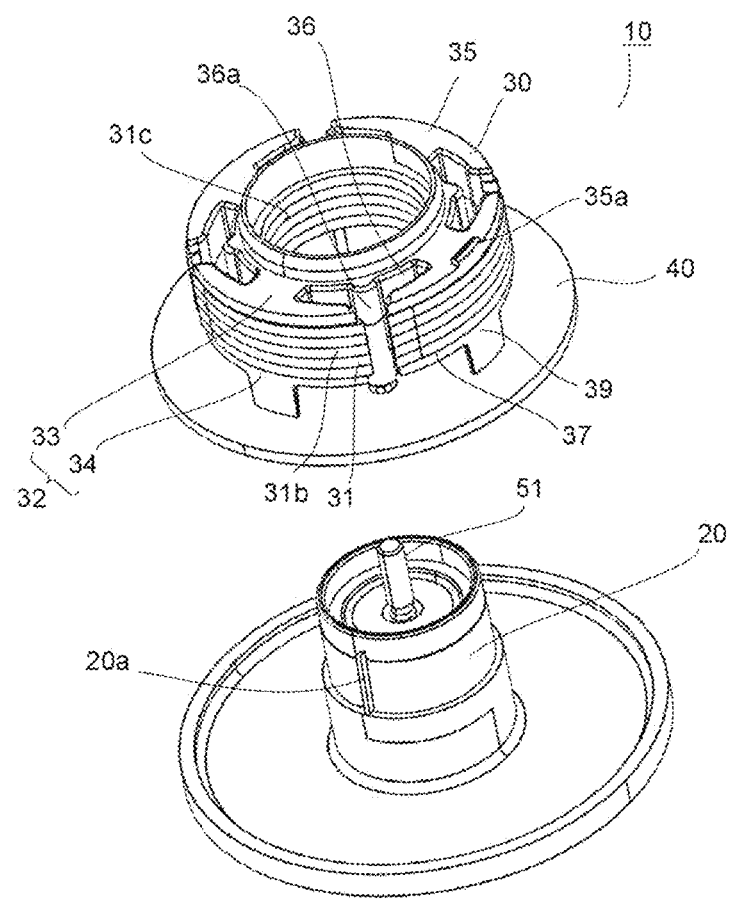
FIG. 2 is an exploded perspective view of a stationary assembly of a motor according to an example embodiment of the present disclosure.
Figure 3:
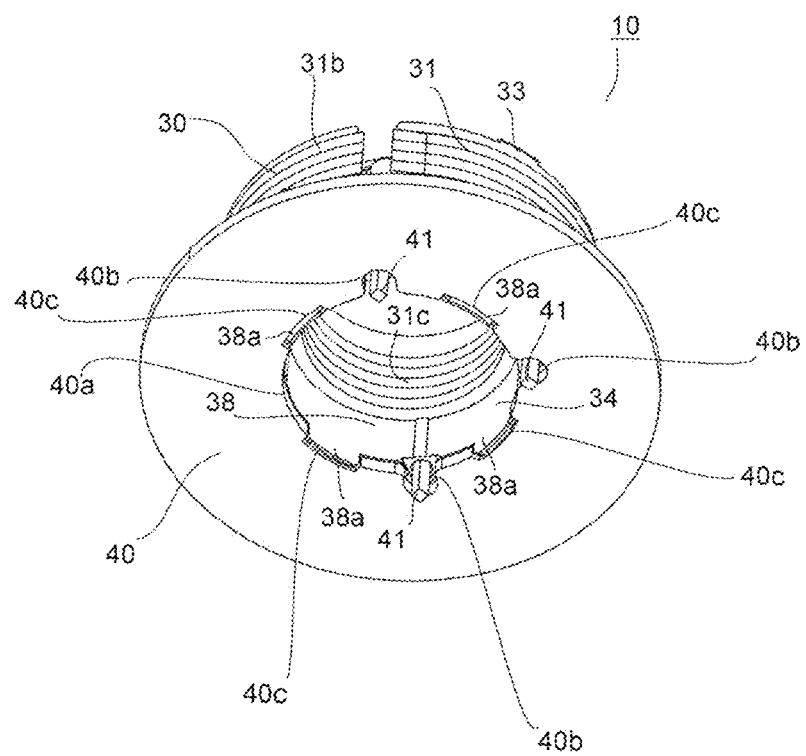
FIG. 3 is a perspective view of a portion of a stationary assembly of a motor according to an example embodiment of the present disclosure as viewed from below.

A motor according to an example embodiment of the present disclosure will be described. FIG. 1 is a perspective view of a vertical cross section of a motor 1 according to an example embodiment of the present disclosure. FIG. 2 is an exploded perspective view of a stationary assembly 10, and FIG. 3 is a perspective view of a part of the stationary assembly 10 as viewed from below. Note that FIGS. 2 and 3 show a state before a bearing housing 20 is fixed to a stator 30.

The motor 1 includes the stationary assembly 10 and a rotary assembly 50. The rotary assembly 50 includes a shaft 51, a rotor holder 52, a magnet 53, and a rotating body 54. The shaft 51 is a columnar metal member that forms a rotation axis extending along a central axis C. The upper end of the shaft 51 is connected to the rotating body 54. That is, the rotary assembly 50 has the shaft 51 that rotates about the central axis C extending vertically.

The rotating body 54 has a cylindrical shape with a cover, and accommodates the rotor holder 52 and the magnet 53 therein. The rotor holder 52 has a cylindrical shape with a cover, and the magnet 53 is fixed to an inner surface thereof. The magnet 53 is disposed radially outside the stationary assembly 10. Note that the magnet 53 may be fixed to the inner surface of the rotor holder 52 via, for example, an annular rotor core provided on the inner surface of the rotor holder 52. The rotor core has a plurality of magnet insertion holes arranged in the circumferential direction, and the magnet 53 is inserted into the magnet insertion hole.

The stationary assembly 10 includes a bearing housing 20, a stator 30, a circuit board 40, and a bearing portion 60.

The bearing housing 20 holds the bearing portion 60 and is formed in a cylindrical shape extending in the axial direction. The bearing portion 60 rotatably supports the shaft 51. For the bearing portion 60, a sleeve bearing mechanism is used, for example. Note that a plurality of ball bearings may be used for the bearing portion 60.

The stator 30 is formed in an annular shape surrounding the central axis C. Further, the stator 30 is disposed radially outside the bearing housing 20. The circuit board 40 is disposed below the stator 30. The circuit board 40 has a board insertion hole 40a. The board insertion hole 40a penetrates the circuit board 40 in the axial direction. The bearing housing 20 is inserted into the board insertion hole 40a in the axial direction.

The stator 30 has a stator core 31, an insulator 32, a coil (not shown), and a conductor (terminal pin) 41. In the present example embodiment, the terminal pin 41 is used as a conductor, but another conductor may be used.

The stator core 31 is formed by laminating a plurality of annular laminated steel plates in the axial direction. At that time, for example, core members 30a adjacent to each other in the axial direction are caulked and joined. The core members 30a adjacent to each other in the axial direction may be joined by welding.

The stator core 31 has a core back 31a and teeth 31b. The core back 31a is formed in an annular shape having a core back insertion hole 31c on the central axis C. The teeth 31b extend radially outward from the radially outer surface of the core back 31a and are arranged in the circumferential direction. For example, the number of the teeth 31b of the present example embodiment is four.

The insulator 32 covers at least a part of the stator core 31. The insulator 32 is made of an insulative resin molded product, and includes an upper insulator 33 and a lower insulator 34. The upper insulator 33 is disposed above the stator core 31, and the lower insulator 34 is disposed below the stator core 31. Although the detailed configurations of the upper insulator 33 and the lower insulator 34 will be described later, the upper insulator 33 and the lower insulator 34 may be formed integrally.

The coil (not shown) is formed by winding a conductive wire (not shown) around the tooth 31b via the insulator 32. The insulator 32 insulates the stator core 31 from the conductive wire.

The terminal pins 41 are arranged at two or more positions between the adjacent teeth 31b. For example, three terminal pins 41 are provided in the present example embodiment. The terminal pin 41 is connected to a conductive wire. The lower end of the terminal pin 41 axially passes through a through-hole 40b (see FIG. 3) formed in the circuit board 40 and protrudes downward of the circuit board 40. Note that the lower end of the terminal pin 41 does not need to protrude downward of the circuit board 40. The lower end of the terminal pin 41 is electrically connected to the circuit board 40 by soldering. That is, the terminal pin 41 is connected to the conductive wire and is connected to the circuit board 40.

The circuit board 40 has the board insertion hole 40a, the through-hole 40b, and a board recess 40c (see FIG. 3). The through-hole 40b is disposed radially outside the board insertion hole 40a and is formed continuously from the board insertion hole 40a. Note that the through-hole 40b and the board insertion hole 40a may not be formed continuously, and the through-hole 40b and the board insertion hole 40a may be arranged at positions separated from each other. The through-holes 40b are provided at a plurality of locations and are arranged at equal intervals in the circumferential direction. For example, three through-holes 40b are provided in the present example embodiment. The board recess 40c is recessed radially outward from the radially inner surface in the board insertion hole 40a. The board recesses 40c are provided at, for example, four locations and are arranged at equal intervals in the circumferential direction.

The bearing housing 20 is formed in a cylindrical shape, and has a housing protrusion 20a protruding radially outward from a radially outer surface (see FIG. 2). That is, the housing protrusion 20a protrudes radially outward from the radially outer surface of the bearing housing 20. The bearing housing 20 is axially inserted into the board insertion hole 40a of the circuit board 40, and is pressed into the core back insertion hole 31c of the core back 31a.

Figure 4:
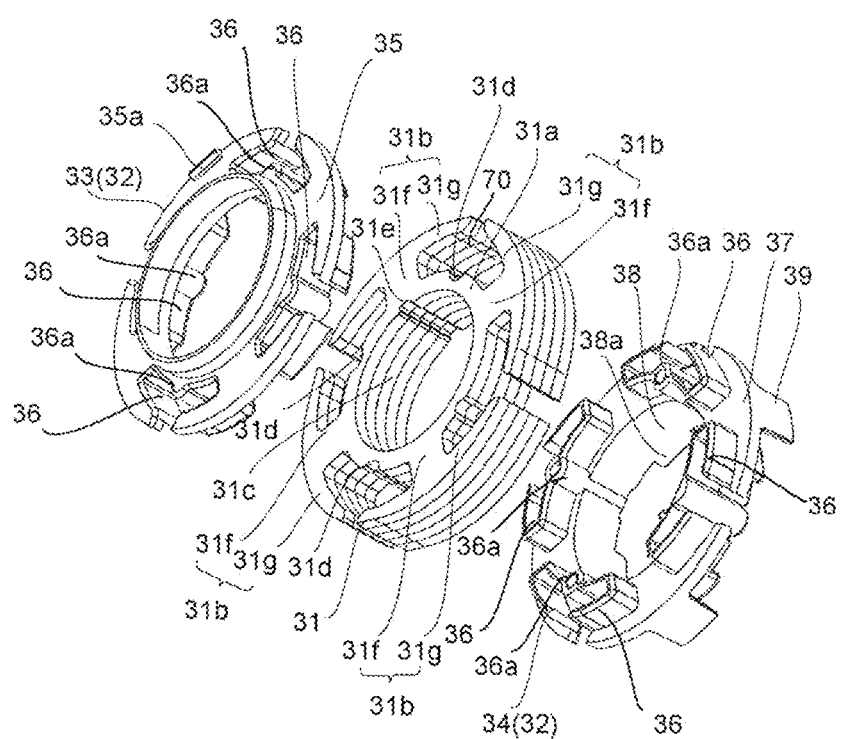
FIG. 4 is an exploded perspective view of a stator and an insulator of a motor according to an example embodiment of the present disclosure.
Figure 5:
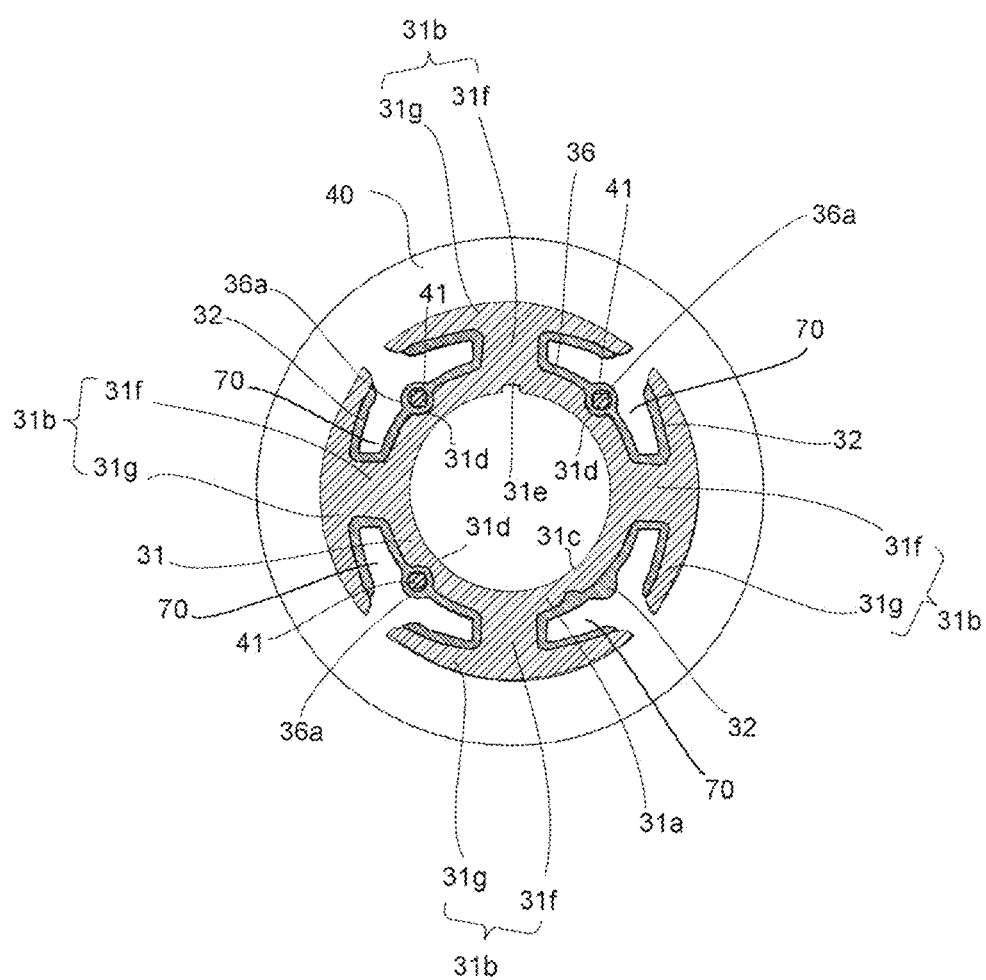
FIG. 5 is a top cross-sectional view of a stator of a motor according to an example embodiment of the present disclosure.
Figure 6:
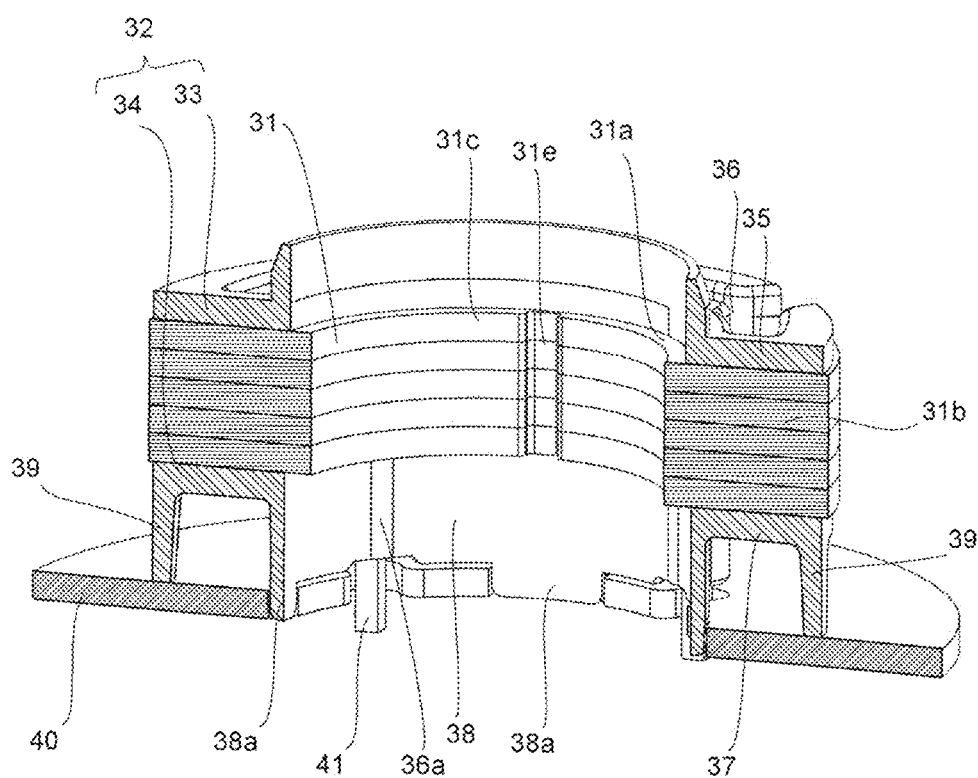
FIG. 6 is a perspective view of a vertical cross section of a stator of a motor according to an example embodiment of the present disclosure.

FIG. 4 is an exploded perspective view of the stator 30 and the insulator 32, and FIGS. 5 and 6 are a top cross-sectional view and a vertical cross-sectional perspective view of the stator 30, in which a conductive wire is omitted.

The tooth 31b of the stator core 31 has an extending portion 31f and an umbrella portion 31g. The extending portion 31f extends radially outward from the radially outer surface of the core back 31a. The umbrella portion 31g extends from the radially outer end of the extending portion 31f to both sides in the circumferential direction.

In the present example embodiment, the umbrella portion 31g is formed symmetrically in the circumferential direction with respect to the center line of the extending portion 31f orthogonal to the central axis C, but may have another configuration. The umbrella portion 31g may be formed asymmetrically in the circumferential direction with respect to the center line of the extending portion 31f orthogonal to the central axis C. As a result, the magnetic force generated between the umbrella portion 31g and the magnet 53 varies in the circumferential direction with respect to the center line of the extending portion 31f orthogonal to the central axis C. Therefore, control of the rotational direction of the motor 1 is facilitated.

The core back 31a has a stator recess 31d and a positioning recess 31e. The stator recess 31d is recessed radially inward from the radially outer surface of core back 31a between adjacent teeth 31b. The stator recesses 31d are provided at, for example, three positions and are arranged between different teeth 31b respectively.

The positioning recess 31e is recessed radially outward from the radially inner surface on the peripheral surface of the core back insertion hole 31c. The positioning recess 31e radially overlaps the teeth 31b. The positioning recess 31e is disposed at one position overlapping the teeth 31b in the radial direction. As a result, the stator recess 31d and the positioning recess 31e are arranged apart from each other in the circumferential direction. Therefore, it is possible to reduce the possibility that the magnetic path formed in the circumferential direction on the core back 31a is narrowed by the stator recess 31d and the positioning recess 31e. The positioning recess 31e is not limited to one location, and a plurality of positioning recesses 31e may be provided.

The bearing housing 20 is pressed into the core back insertion hole 31c of the core back 31a and fixed to the stator 30 (see FIG. 2). At this time, the housing protrusion 20a of the bearing housing 20 is fitted in the positioning recess 31e in the circumferential direction. Thereby, the stator 30 is easily positioned in the circumferential direction with respect to the bearing housing 20.

The insulator 32 has an upper insulator 33 and a lower insulator 34 vertically sandwiching the stator core 31. The upper insulator 33 has an upper surface cover portion 35 and a protrusion 35a. The lower insulator 34 has a lower surface cover portion 37, a wall portion 38, and an insulator support portion 39. Further, a side surface cover portion 36 and a terminal holding portion 36a which are divided in the axial direction are provided to each of the upper insulator 33 and the lower insulator 34.

The upper surface cover portion 35 covers the upper surfaces of the core back 31a and the teeth 31b. The protrusion 35a protrudes upward from the upper surface of the upper surface cover portion 35. Further, the protrusion 35a is disposed on the outer edge of the tooth 31b disposed radially outside the positioning recess 31e. That is, the protrusion 35a is disposed at a position radially overlapping the positioning recess 31e. Thus, the position of the positioning recess 31e can be easily grasped using the position of the protrusion 35a as a mark. Therefore, workability at the time of press-fitting the bearing housing 20 into the core back insertion hole 31c of the core back 31a is improved.

The lower surface cover portion 37 covers the lower surfaces of the core back 31a and the teeth 31b. The insulator support portion 39 protrudes axially downward from the lower surface of the lower surface cover portion 37 at the radially outer edge of the lower surface cover portion 37. The insulator support portion 39 is disposed on the outer edge of each tooth 31b. The lower end of the insulator support portion 39 contacts the upper surface of the circuit board 40. Thus, the insulator 32 is stably supported on the circuit board 40.

The wall portion 38 is disposed radially inside the insulator support portion 39, and extends axially downward from the lower surface of the lower surface cover portion 37 at a radially inner edge of the lower surface cover portion 37. The wall portion 38 is formed in a cylindrical shape surrounding the radially inner surface of the core back 31a.

The wall portion 38 has an insulator protrusion 38a. The insulator protrusions 38a protrude axially downward from the lower end of the wall portion 38, and are provided at a plurality of positions in the circumferential direction at equal intervals (see FIG. 3). For example, the insulator protrusions 38a of the example embodiment are provided at four positions. The insulator protrusion 38a fits radially with the board recess 40c. That is, the insulator 32 protrudes axially downward of the lower surface cover portion 37, is disposed radially inside the insulator support portion 39, and has the insulator protrusion 38a that fits radially with the board recess 40c. Thereby, the insulator 32 is easily positioned in the circumferential direction with respect to the circuit board 40.

The side surface cover portion 36 is disposed between the adjacent teeth 31b, and covers the radially outer surface of the core back 31a, the circumferentially outer surface of the extending portion 31f, and the radially inner surface of the umbrella portion 31g. Inside the side surface cover portion 36, a slot 70 including a space between the adjacent teeth 31b is formed.

The upper portion of the side surface cover portion 36 extends axially downward from the upper surface cover portion 35 along the stator core 31. The lower portion of the side surface cover portion 36 extends axially upward from the lower surface cover portion 37 along the stator core 31.

The terminal holding portion 36a is arranged between the teeth 31b, extends in the axial direction, and is formed in a cylindrical shape. The terminal holding portion 36a accommodates the terminal pin 41, and the terminal pin 41 is insulated from the stator core 31.

The terminal holding portion 36a is integrated with the side surface cover portion 36 above the lower surface cover portion 37 and fits with the stator recess 31d. That is, the terminal holding portion 36a and the side surface cover portion 36 are a single member. That is, the stator recess 31d accommodates at least a part of the terminal holding portion 36a. Thereby, the terminal holding portion 36a can be disposed far away from the umbrella portion 31g radially inward, and the space of the slot 70 is expanded. Therefore, it is possible to increase the number of turns of the conductive wire wound around the tooth 31b. In addition, when the conductive wire is wound around the tooth 31b, the conductive wire can be prevented from being caught by the terminal holding portion 36a. Therefore, productivity of the motor 1 can be improved.

Further, the terminal holding portion 36a has an inner terminal holding portion 36b and an outer terminal holding portion 36c. The inner terminal holding portion 36b directly faces the stator recess 31d in the radial direction. The outer terminal holding portion 36c radially faces the stator recess 31d via the inner terminal holding portion 36b. At least a part of the inner terminal holding portion 36b is located radially inside the outer peripheral surface of the core back 31a adjacent to the stator recess 31d. Further, the outer terminal holding portion 36c is located radially outside the outer peripheral surface of the core back 31a adjacent to the stator recess 31d. This allows the outer terminal holding portion 36c to support the conductive wire wound around the tooth 31b in the circumferential direction, thereby preventing collapse of winding of the conductive wire.

Note that the outer terminal holding portion 36c may be positioned radially inside the outer peripheral surface of the core back 31a adjacent to the stator recess 31d. Thereby, the space of the slot 70 is further expanded. Therefore, the number of turns of the conductive wire wound around the tooth 31b can be further increased.

Further, the terminal holding portion 36a is integrated with the wall portion 38 below the lower surface cover portion 37. That is, the terminal holding portion 36a and the wall portion 38 are a single member. The lower end of the terminal holding portion 36a is located axially above the upper surface of the circuit board (see FIG. 6). Accordingly, it is possible to prevent the conductive wire connected to the terminal pin 41 from being caught and disconnected between the insulator 32 and the circuit board 40.

The above example embodiment is merely an example of the present disclosure. The configuration of the example embodiment may be appropriately changed without departing from the technical idea of the present disclosure. Moreover, example embodiments may be implemented in combination as far as possible.

The motor of the present disclosure can be applicable to, for example, a vehicle-mounted cooling blower.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A motor comprising:
a stationary assembly; and
a rotary assembly including a shaft that rotates about a central axis extending vertically; wherein the stationary assembly includes:
  a stator in an annular shape surrounding the central axis; and
  a circuit board axially below the stator;
the stator includes:
  a stator core including a core back with an annular shape and teeth extending radially outward from the core back and arranged in a circumferential direction;
  an insulator that covers at least a portion of the stator core;
  a coil in which a conductive wire is wound around each of the teeth via the insulator; and
  a conductor connected to the conductive wire and connected to the circuit board;
the insulator includes a terminal holder that has a cylindrical shape, is arranged between the teeth that are adjacent to each other, extends in an axial direction, and accommodates the conductor;
the core back includes a stator recess that is located between the teeth adjacent to each other and is recessed radially inward from a radially outer surface; and
the stator recess accommodates at least a portion of the terminal holder.

2. The motor according to claim 1, wherein
the terminal holder includes:
  an inner terminal holding portion that directly opposes the stator recess in the radial direction; and
  an outer terminal holding portion radially opposes the stator recess via the inner terminal holding portion; and
the outer terminal holding portion is positioned radially outside an outer peripheral surface, adjacent to the stator recess, of the core back.

3. The motor according to claim 1, wherein
the terminal holder includes:
  an inner terminal holding portion that directly opposes the stator recess in the radial direction; and
  an outer terminal holding portion radially opposes the stator recess via the inner terminal holding portion; and
the outer terminal holding portion is located radially inside an outer peripheral surface, adjacent to the stator recess, of the core back.

4. The motor according to claim 1, wherein a lower end of the terminal holder is located axially above an upper surface of the circuit board.

5. The motor according to claim 1, wherein
the stationary assembly includes:
  a bearing portion rotatably supporting the shaft; and
  a bearing housing in a cylindrical shape extending in the axial direction, the bearing housing holding the bearing portion;
the bearing housing includes a housing protrusion protruding radially outward from a radially outer surface;
the core back includes a positioning recess that is recessed radially outward from a radially inner surface and fits radially with the housing protrusion; and
the positioning recess overlaps the tooth in a radial direction.

6. The motor according to claim 5, wherein
the insulator includes:
  an upper surface cover portion that covers the upper surface of the tooth; and
  a protrusion that protrudes upward from an upper surface of the upper surface cover portion, and is on an outer edge of the tooth that radially overlaps the positioning recess.

7. The motor according to claim 1, wherein
the insulator includes:
  a lower surface cover portion that covers a lower surface of the tooth; and
  an insulator support portion that protrudes downward of the lower surface cover portion and is in contact with an upper surface of the circuit board.

8. The motor according to claim 5, wherein
the circuit board includes:
  a board insertion hole into which the bearing housing is inserted; and
  a board recess that is recessed radially outward from a radially inner surface in the board insertion hole; and
the insulator includes:
  a lower surface cover portion that covers a lower surface of the teeth; and
  an insulator protrusion that protrudes downward of the lower surface cover portion, is radially inside the insulator support portion, and fits in the board recess.

9. The motor according to claim 1, wherein
the tooth includes:
  an extending portion extending radially outward from a radially outer surface of the core back; and
  an umbrella portion extending from a radially outer end of the extending portion to two sides in the circumferential direction; and
the umbrella portion is asymmetrical in a circumferential direction with respect to a center line of the extending portion orthogonal to the central axis.

* * * * *